(12) United States Patent
Charania et al.

(10) Patent No.: US 10,108,626 B2
(45) Date of Patent: Oct. 23, 2018

(54) PROACTIVELY CLEARING DIGITAL STORAGE

(71) Applicant: Verizon Patent and Licensing Inc., Arlington, VA (US)

(72) Inventors: Rahim Charania, Euless, TX (US); Brian P. Higgins, Mountain Lakes, NJ (US); Joseph E. Berger, Jr., Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 475 days.

(21) Appl. No.: 14/476,427

(22) Filed: Sep. 3, 2014

(65) Prior Publication Data

US 2016/0063009 A1    Mar. 3, 2016

(51) Int. Cl.
*G06F 17/30*    (2006.01)

(52) U.S. Cl.
CPC .. *G06F 17/30085* (2013.01); *G06F 17/30117* (2013.01)

(58) Field of Classification Search
CPC ......... G06F 17/30085; G06F 17/30117; G06F 17/30
See application file for complete search history.

(56) References Cited

U.S. PATENT DOCUMENTS

| | | | |
|---|---|---|---|
| 2012/0188405 A1* | 7/2012 | Morrison | G06F 17/30265 348/231.2 |
| 2014/0050369 A1* | 2/2014 | Ghuge | H04N 1/2195 382/115 |
| 2014/0136493 A1* | 5/2014 | Subramanian | G06F 17/30138 707/693 |
| 2014/0184820 A1* | 7/2014 | Chakra | G06F 3/005 348/207.1 |

* cited by examiner

*Primary Examiner* — Kristopher Andersen (57) ABSTRACT

A device may monitor an amount of storage available on a user device; determine, based on the monitoring, that the amount of storage is below a particular threshold; score multiple data files stored by the user device; determine particular data files, of the multiple data files, that should be deleted from the user device based on the scoring and based on the amount of storage available on the user device; and cause, based on determining that the amount of storage is below the particular threshold, the user device to delete the particular data files from the user device. The user device may have an amount of available storage space exceeding the particular threshold after deleting the particular data files.

20 Claims, 9 Drawing Sheets

| Attribute | Value | Weighting Factor |
|---|---|---|
| Date Modified | 0-10 (Variable) | 2 |
| Date Accessed | 0-10 (Variable) | 2 |
| Viewed | 0 | 5 |
| Not viewed | 50 | 5 |
| Edited/Enhanced | 20 | 4 |
| Image contents = Family | 30 | 10 |
| Image quality = Blurry | -30 | 6 |
| User rating = High | 20 | 5 |
| User rating = Medium | 10 | 5 |
| User rating = Low | -10 | 5 |
| File size > 10 MB | -20 | 7 |
| File size > 50 MB | -50 | 7 |

PROACTIVELY CLEARING DIGITAL STORAGE

BACKGROUND

User devices, such as mobile telephones, are often used to capture and store images, audio, video, and/or other types of content. The amount of data (e.g., data for images, audio, videos, etc.) that the user device may store may be limited by the amount of storage space available on the user device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may monitor an amount of free storage space remaining on a user device, and may clear storage space when the amount of free storage space falls below a particular threshold. In some implementations, the storage space may be cleared in order to make room available for the storage of additional content, such as photos, videos, documents, or the like. In some implementations, content may be removed from the user device and uploaded to a remote storage device (e.g., a cloud storage device) in order to make room available on the user device without the loss of content removed from the user device. Also, duplicate images, blurry images, etc., may be removed from the user device in order to clear storage space.

Figure 1:
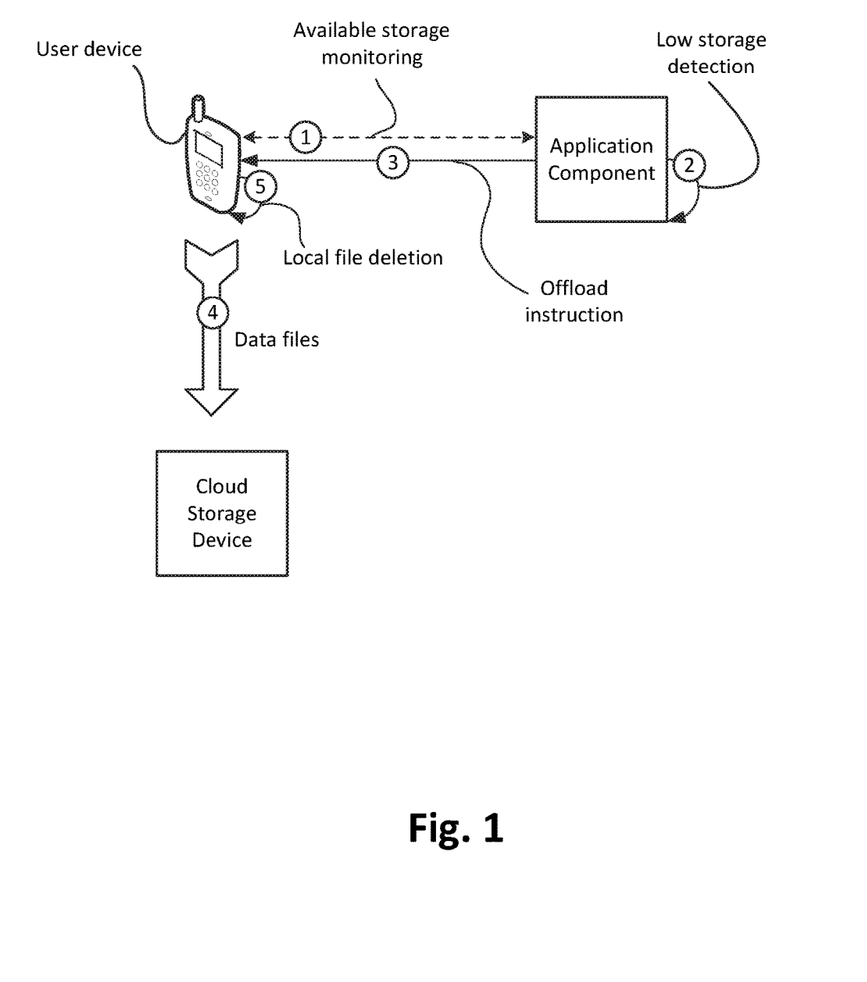
FIG. 1 illustrates an example overview of an implementation of proactively clearing storage space on a user device, in accordance with some implementations described herein.

FIG. 1 illustrates an example implementation as described herein. As shown in FIG. 1, a user device may communicate with an application component. The application component may, for example, include an application running on the user device and/or an external device. The application component may monitor an amount of free storage space on the user device (arrow 1). For example, the application component may monitor the amount of free storage space on a hard drive, a removable storage device (e.g., a secure digital (SD) card), an internal (e.g., integrated) storage device, etc., associated with the user device. The application component may monitor the amount of free storage space on the user device as the storage on the user device is consumed (e.g., as a user of the user device captures images or video using the user device, downloads files to the user device, etc.). The application component may detect that the user device is running low on storage (arrow 2) when the amount of storage space drops below a particular threshold.

When the amount of storage space drops below the particular threshold, the application component may output an offload instruction (arrow 3) to direct the user device to offload particular data files from the user device (e.g., particular image files, video files, audio files, document files, etc.). For example, the application component may direct the user device to offload the particular data files by outputting the data files to a cloud storage device (arrow 4) and subsequently deleting the data files from the user device (arrow 5). As a result, storage space on the user device may be proactively cleared so that a user of the user device may capture additional images/videos or download files to the user device without having to reactively and manually delete data files from the user device in order to make space available.

In some implementations, the application component may direct the user device to delete the data files without outputting the data to the cloud storage server. Additionally, or alternatively, the application component may direct the user device to compress the particular data files to reduce the amount of storage space consumed by the data files.

In some implementations, the application component may score individual data files, and may direct the user device to offload data files having the lowest scores. For example, the application component may score a data file based on attributes of the data file. The attributes may include, for instance, a date on which the data file was created or modified, a user's level of interest in the data file, a quality of the data file (e.g., where a data file corresponding to a blurry image may be scored lower than a clear image), information regarding whether the data file is a duplicate data file, and/or some other information regarding the data file.

Figure 2:
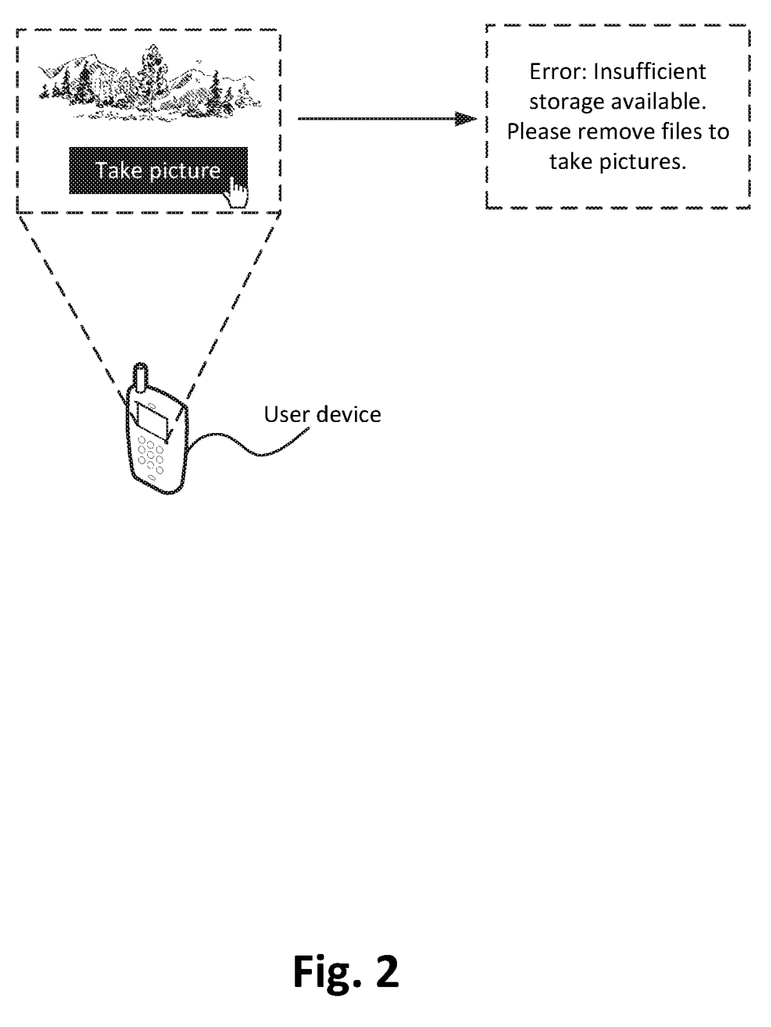
FIG. 2 illustrates a situation where proactively clearing storage space on a user device may be desirable.

FIG. 2 illustrates a situation where proactively clearing storage space on a user device may be desirable. In FIG. 2, assume that a user device has insufficient space to capture an image. Given this assumption, the user device may display an indication that insufficient space remains on the user device to capture the image (e.g., when a user of the user device attempts to capture an image using the user device). In response to this indication, a user of the user device may need to reactively and manually clear space on the user device in order to capture an image (e.g., by manually deleting images, videos, and/or other files stored on the user device).

Figure 3:
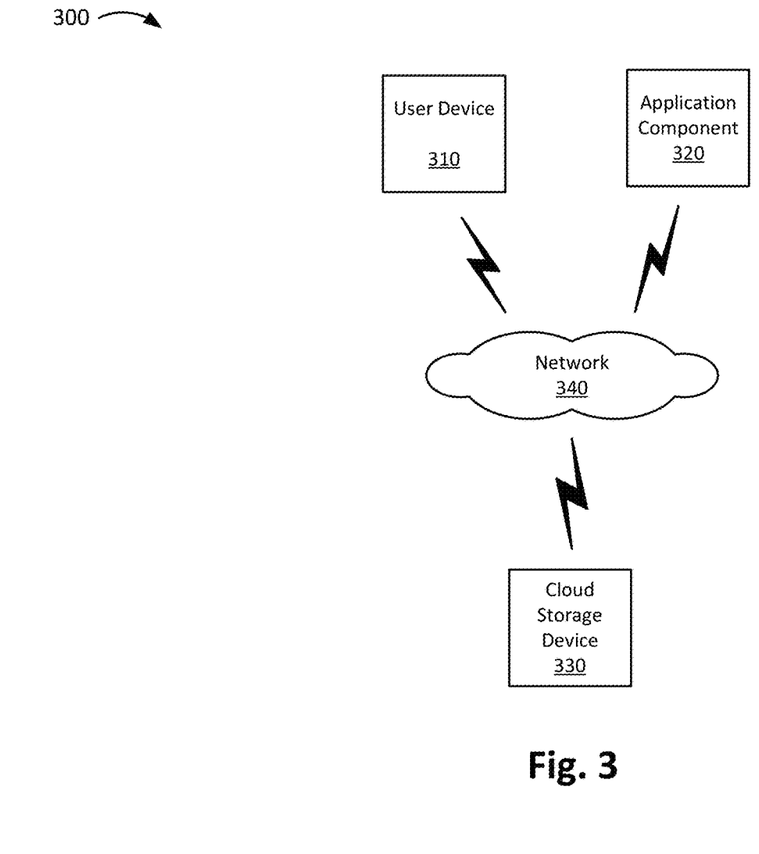
FIG. 3 illustrates an example environment in which systems and/or methods, described herein, may be implemented.

FIG. 3 is a diagram of an example environment 300 in which systems and/or methods described herein may be implemented. As shown in FIG. 3, environment 300 may include user device 310, application component 320, cloud storage device 330, and network 340.

User device 310 may include a device capable of communicating via a network, such as network 340. For example, user device 310 may correspond to a mobile communication device (e.g., a smart phone or a personal digital assistant (PDA)), a portable computer device (e.g., a laptop or a tablet computer), a gaming device, or another type of device.

User device 310 may implement an application that may communicate with application component 320 to proactively clear storage space on user device 310. In some implementations, the application may be used to set thresholds in which storage space should be cleared (e.g., a 10% free space remaining threshold, a 20% free space remaining threshold, etc.). In some implementations, user device 310 may implement some or all of the functionality associated with application component 320.

Application component 320 may include a server device, or a collection of server devices. Additionally, or alternatively, application component 320 may be implemented partially or entirely by hardware circuitry and/or processing logic of user device 310. In some implementations, application component 320 may monitor an amount of free space remaining on a storage device of user device 310. Application component 320 may score data files stored by user device 310, and may generate an instruction to direct user device 310 to offload particular data files when the amount of remaining free space drops below a particular threshold. For example, application component 320 may direct user device 310 to offload the data files having the lowest scores (e.g., so that the amount of free space remaining after the offloading exceeds the threshold). Also, application component 320 may direct user device 310 to output data files to cloud storage device 330 prior to deleting the data files from user device 310. Additionally, or alternatively, application component 320 may direct user device 310 to compress data files.

Cloud storage device 330 may include a server device, or a collection of server devices. In some implementations, cloud storage device 330 may store data files on behalf of a user of user device 310. For example, cloud storage device 330 may store data files so that the data files may be removed from a local storage of user device 310. In some implementations, cloud storage device 330 may include a particular amount of storage space reserved for a particular user based on a subscription level of the user.

Network 340 may include one or more wired and/or wireless networks. For example, network 340 may include a cellular network (e.g., a second generation (3G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 340 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 300 is not limited to what is shown in FIG. 3. In practice, environment 300 may include additional devices and/or networks; fewer devices and/or networks; different devices and/or networks; or differently arranged devices and/or networks than illustrated in FIG. 3. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 4:
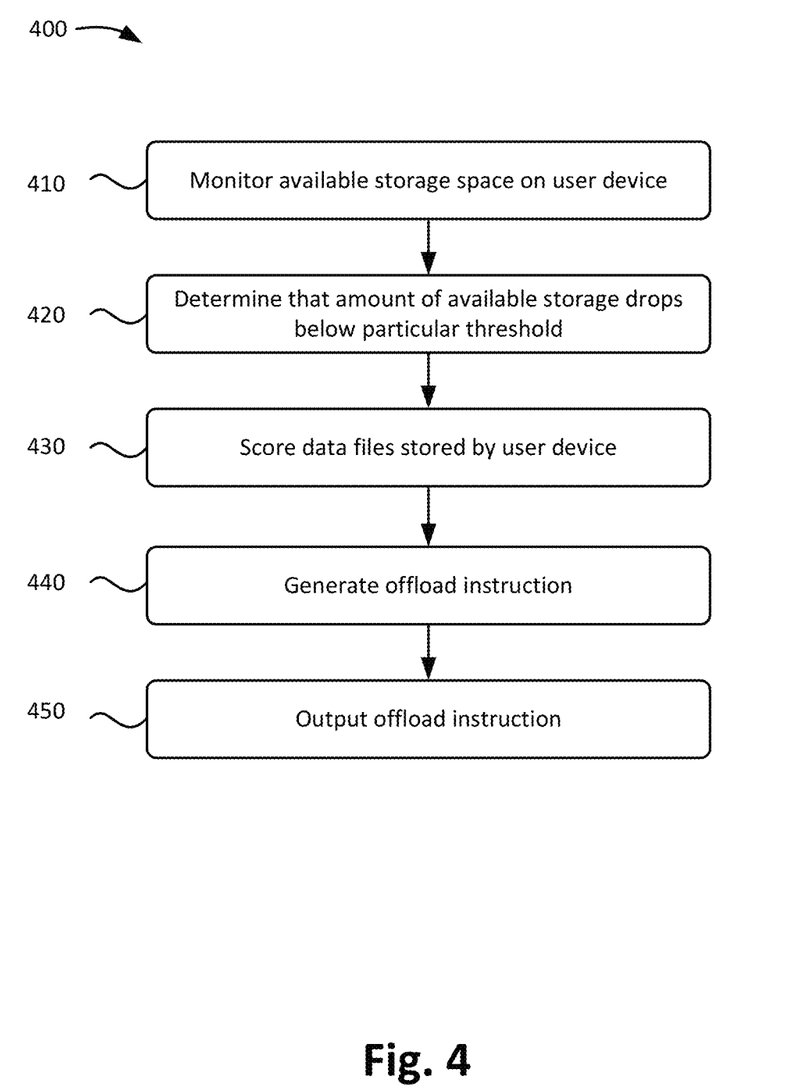
FIG. 4 illustrates a flowchart of an example process for proactively clearing storage space on a user device.

FIG. 4 illustrates a flowchart of an example process 400 for proactively clearing storage space on a user device. In some implementations, process 400 may be performed by application component 320. As mentioned above, application component 320 may, in some implementations, be incorporated as part of user device 310. In some implementations, some or all of blocks of process 400 may be performed by one or more other devices.

As shown in FIG. 4, process 400 may include monitoring available storage space on a user device (block 410). For example, application component 320 may monitor an amount of available storage on user device 310. In some implementations, particular portions of user device 310 may be monitored (e.g., internal memory of user device 310, external or removable storage devices associated with user device 310, such as secure digital cards, etc.). In some implementations, the portions of user device 310 monitored by application component 320 may be user-configurable or developer-configurable.

Process 400 may also include determining that the amount of available storage has dropped below a particular threshold (block 420). For example, application component 320 may determine that the amount of available storage has dropped below a particular threshold as storage space on user device 310 is consumed (e.g., as images, audio, and/or video are captured by user device 310, as data files are downloaded to user device 310, etc.). In some implementations, the threshold may be in terms of a percentage of total available storage. Alternatively, the threshold may be in terms of a quantity of bytes, kilobytes, megabytes, gigabytes, etc. of available storage. In some implementations, different thresholds may apply to different types of storage associated with user device 310. For example, one threshold may apply to internal storage, whereas a different threshold may apply to removable storage.

Process 400 may further include scoring data files stored by the user device (block 430). For example, application component 320 may score each data file based on one or more attributes of each data file. For a particular data file, a value may be determined for each attribute of the data file, and the values may be combined to determine a score for the data file. As an example, one attribute may relate to a date in which the data files were created or modified (e.g., a "date created or modified" attribute). The value of this attribute may be relatively higher for more recent created or modified dates. In some implementations, the value of the "date created or modified" attribute may be relatively higher for particular dates, such as dates corresponding to holidays, birthdays, and/or special events (e.g., personal vacations, etc.). Information regarding such dates may be based on information received from an external source identifying the dates (e.g., a server that stores calendar information identifying events for a user).

Another attribute may relate to a date in which a data file was last accessed (e.g., a "data accessed" attribute). The value of this attribute may be relatively higher for more recent access dates. For example, data files that have been accessed relatively sooner than other data files will have higher scores for the "date accessed" attribute, and hence, are less likely to be offloaded or deleted from user device 310. As data files continue to age, the value of the "date accessed" may be reduced accordingly. Another attribute may relate to whether a data file (e.g., a video data file) has been viewed or not viewed. The value of this attribute may be relatively lower for videos already viewed than for videos that have not yet been viewed. Another attribute may relate to whether a data file (e.g., an image or video) has been edited by a user (e.g., cropped, trimmed, enhanced, etc.). The value of this attribute may be relatively higher for data files that have been edited (e.g., since edited data files may be of more importance than data files that have not been edited).

In some implementations, an attribute may relate to a measure of quality of a data file (e.g., a resolution, a measure of clarity, etc.). For example, the value of an attribute related to the clarity of an image (e.g., a "clarity" attribute) may be proportional to the clarity (e.g., blurry images having relatively lower clarity may have a relatively lower value for the "clarity" attribute). In some implementations, attributes may relate to objects and/or individuals included in a data file (e.g., based on pixel-based classification techniques, facial recognition techniques, etc.). For example, a value may be assigned for images having particular individuals (e.g., family members). In some implementations, the values associated with attributes may be based on user-defined preference information. For example, a user may indicate that data files having particular contents (e.g., images and/or videos having particular individuals, documents containing particular text, etc.) should be scored relatively higher than data files that do not contain the particular contents. Similarly, a user may indicate that data files (e.g., images and/or videos) associated with particular locations (e.g., locations a threshold distance from the user's home location), should be scored relatively higher than data files associated with the home location. Some examples attributes and corresponding values are described below with respect to FIG. 5.

As described above, application component 320 may score a particular data file by combining values for each attribute associated with the particular data file. For example, application component 320 may add, subtract, multiply, and/or divide the values to obtain a score for the particular data file. In some implementations, the values may be weighted (e.g., values corresponding to whether an image contains a family member may be weighted higher than values corresponding to when an image was taken). In some implementations, application component 320 may continuously score data files whether or not the amount of available storage space on user device 310 has dropped below the particular threshold. For example, application component 320 may continuously score data files (e.g., as the date files age, as user preference information updates, as the user tags favorite data files, or updates ratings of data files). In some implementations, application component 320 may score images when an amount of available storage is less than a threshold. Additionally, or alternatively, application component 320 may score images at any time, whether or not the amount of available storage is less than the threshold.

Process 400 may further include generating an offload instruction (block 440). For example, application component 320 may generate the offload instruction based on the scores of the data files, an amount of storage available on user device 310, and/or an amount of reserved storage remaining on cloud storage device 330 (e.g., storage reserved for a user of user device 310 based on a subscription level). As an example, application component 320 may generate an offload instruction that directs user device 310 to delete data files having the lowest scores so that the amount of free storage space on user device 310 (e.g., after the deletion of the data files) exceeds a particular threshold. For example, assume that the particular threshold is 500 megabytes (MB). Further, assume that 15 of the lowest scored data files cumulatively consume 500 MB of storage space. Given these assumptions, application component 320 may generate an offload instruction to direct user device 310 to delete the 15 lowest scored data files. In some implementations, application component 320 may generate an offload instruction to delete larger data files in favor of smaller data files.

In some implementations, the offload instruction may direct user device 310 to output the data files to cloud storage device 330 for storage (e.g., prior to deleting the data files). In some implementations, the offload instruction may direct user device 310 to output some of the data files to cloud storage device 330 (e.g., if insufficient storage space is available on cloud storage device 330).

In some implementations, the offload instruction may direct user device 310 to compress particular data files. For example, the offload instruction may direct user device 310 to compress the lowest scored images and/or video files to a lower resolution, and/or to reduce the audio bitrate of the lowest scored audio files. In some implementations, application component 320 may generate the offload instruction to direct user device 310 to compress the particular data files based on the scoring of the particular data files. For example, the lower the score of a data file, the higher the level of compression may be.

In some implementations, application component 320 may determine whether to delete, offload, or compress data files based on a score and/or an amount of available space on cloud storage device 330. For example, if sufficient space is available on cloud storage device 330, and the score is below a particular threshold, application component 320 may determine that the data file should be stored on cloud storage device 330 and deleted off of user device 310. As another example, if sufficient space is not available on cloud storage device 330, and the score is above a particular threshold, application component 320 may determine that the data file should be compressed, but not deleted entirely. As another example, if sufficient space is not available on cloud storage device 330, and the score is above a particular threshold, application component 320 may determine that the data file should be retained and not compressed, and that other data files having lower scores should be compressed and/or deleted. As another example, if sufficient space is not available on cloud storage device 330, and the score is below a particular threshold, application component 320 may determine that the data file should be deleted entirely. Application component 320 may cause user device 310 to display a confirmation to delete data files prior to deleting data files without outputting the data files to cloud storage device 330.

Process 400 may further include outputting the offload instruction (block 450). For example, application component 320 may output the offload instruction to user device 310. Based on receiving the offload instruction, user device 310 may execute the offload instruction to output particular data files to cloud storage device 330, delete particular data files from user device 310, and/or compress particular data files. As a result, storage space on user device 310 may be proactively cleared so that the storage space may be used to capture and/or store images, video, audio, and/or other types of data files, without requiring a user to reactively and manually delete data files from user device 310 in order to make storage space available on user device 310.

While process 400 is described in terms of offloading data files from user device 310 when an amount of available storage space drops below a particular threshold, user device 310 may offload data files when an amount of storage consumed exceeds a particular threshold. For example, application component 320 may determine that the amount of storage consumed on user device 310 has exceeded a particular threshold, and cause user device 310 to offload data files so that the amount of storage space consumed on user device 310 is below the particular threshold.

Figure 5:
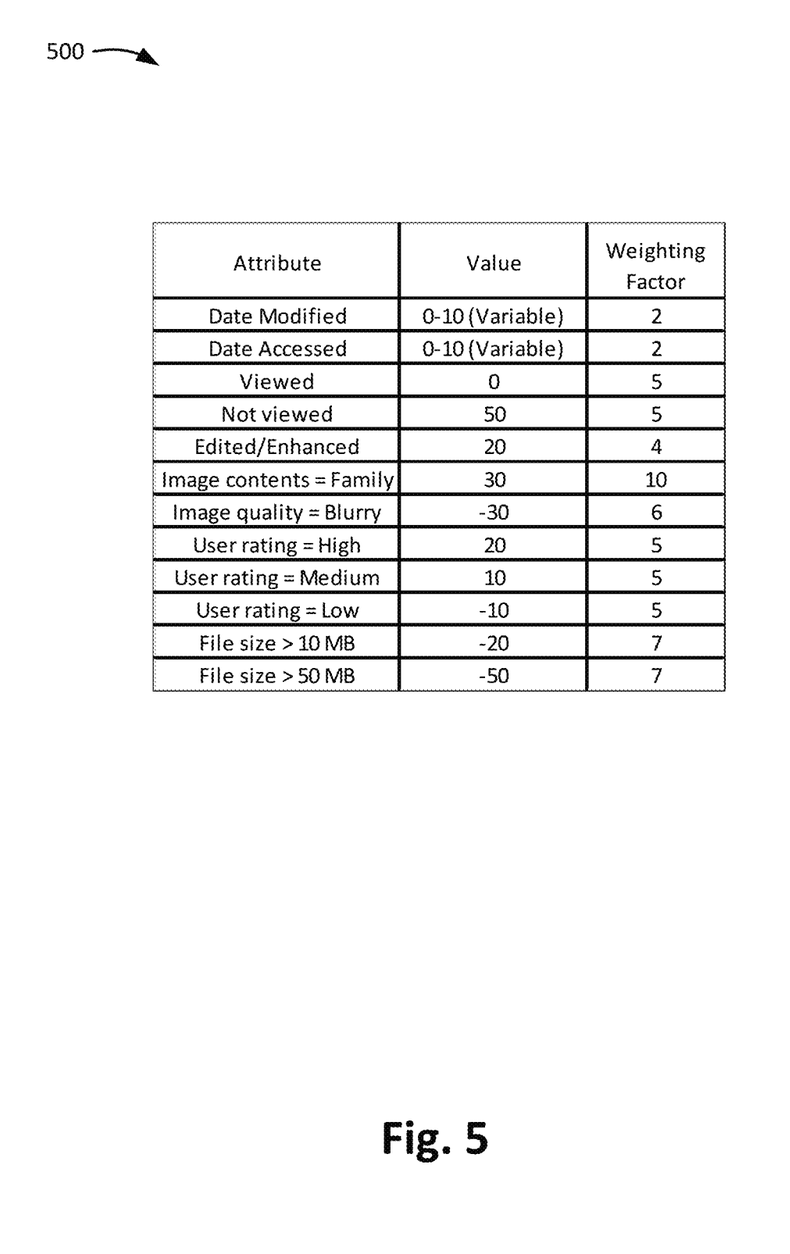
FIG. 5 illustrates an example data structure that may store information identifying values for corresponding attributes of a data file.

FIG. 5 illustrates an example data structure 500 that may store information identifying values for corresponding attributes of a data file. In some implementations, data structure 500 may be stored in a memory of application component 320. In some implementations, data structure 500 may be stored in a memory separate from, but accessible by, application component 320 (e.g., a "cloud" storage device). In some implementations, data structure 500 may be stored by some other device in environment 300, such as user device 310. A particular instance of data structure 500 may contain different information and/or fields than another instance of data structure 500.

Each field in data structure 500 may store information identifying attributes and corresponding values. As shown in FIG. 5, data structure 500 may store a fixed value for a particular attribute, or a dynamic value for a particular attribute. As an example, data structure 500 may store information identifying the "date modified" attribute and a corresponding dynamic value for the "date modified" attribute (e.g., a value that may range from 0 to 10 based on a current date and a date in which a data file was modified). As another example, data structure 500 may store information identifying a fixed value of 0 for data files (e.g., video files) that have been viewed, and a fixed value of 50 for data files that have not been viewed (e.g., so that videos that have been viewed are scored lower than videos that have not been viewed and are more likely to be offloaded from user device 310).

As another example data structure 500 may store information identifying a fixed value of 20 for data files (e.g., images or videos) that have been edited or enhanced (e.g., since edited or enhanced data files may indicate a higher level of importance to a user than files that have not been edited or enhanced). As another example, data structure 500 may store information identifying a fixed value of 30 for data files (e.g., images or videos) containing a particular individual (e.g., a family member). As another example, data structure 500 may store information identifying a fixed value of 20 for data files rated as "High" by a user, a fixed value of 10 for data files rated as "Medium" by the user, and a fixed value of −10 for data files rated as "Low" by the user. As another example, data structure 500 may store information identifying a fixed value of −20 for data files larger than 10 megabytes (MB) in size, and a fixed value of −50 for data files larger than 50 MB in size (e.g., so that larger data files are scored relatively lower and are more likely to be offloaded from user device 310).

Information included in data structure 500 may be used to score a data file stored by user device 310. For example, application component 320 may determine the attributes of the data file, determine the values of each attribute (e.g., the values specified in data structure 500), and combine the values to generate a score for the data file. In some implementations, data structure 500 may store weighting information for each attribute. For example, the attribute relating to whether an image and/or video contains a user's family member may be weighted higher than the attribute relating to when the data file was modified. In some implementations, particular values may not apply when a data file has particular attributes. For example, if a "blurry effect" has been added to an image (e.g., if a user has applied a filter that applies a blurry a effect, or any filter at all), then the value for the attribute relating to blurry images may not apply.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible. For example, data structure 500 may store values for video files associated with other attributes, such as videos associated with a particular title, television show, genre, etc. The values may be based on user preference information, popularity information, and/or other factors that indicate the importance of certain video files relative to other video files. The values may be used to score the video files so that lower scored video files are offloaded ahead of higher scored video files. Additionally, or alternatively, the values may be based on other attributes, such as file metadata. For example, the values may be based on metadata identifying a date in which a data file was created, modified, or accessed, a file size of the data file, a geographic location associated with the data file, a type of camera used to capture an image or video corresponding to the data file (e.g., a front-facing camera or a rear-facing camera of user device 310, or a make or model of a camera), a type of lens used to capture an image or video, etc.

Figure 6:
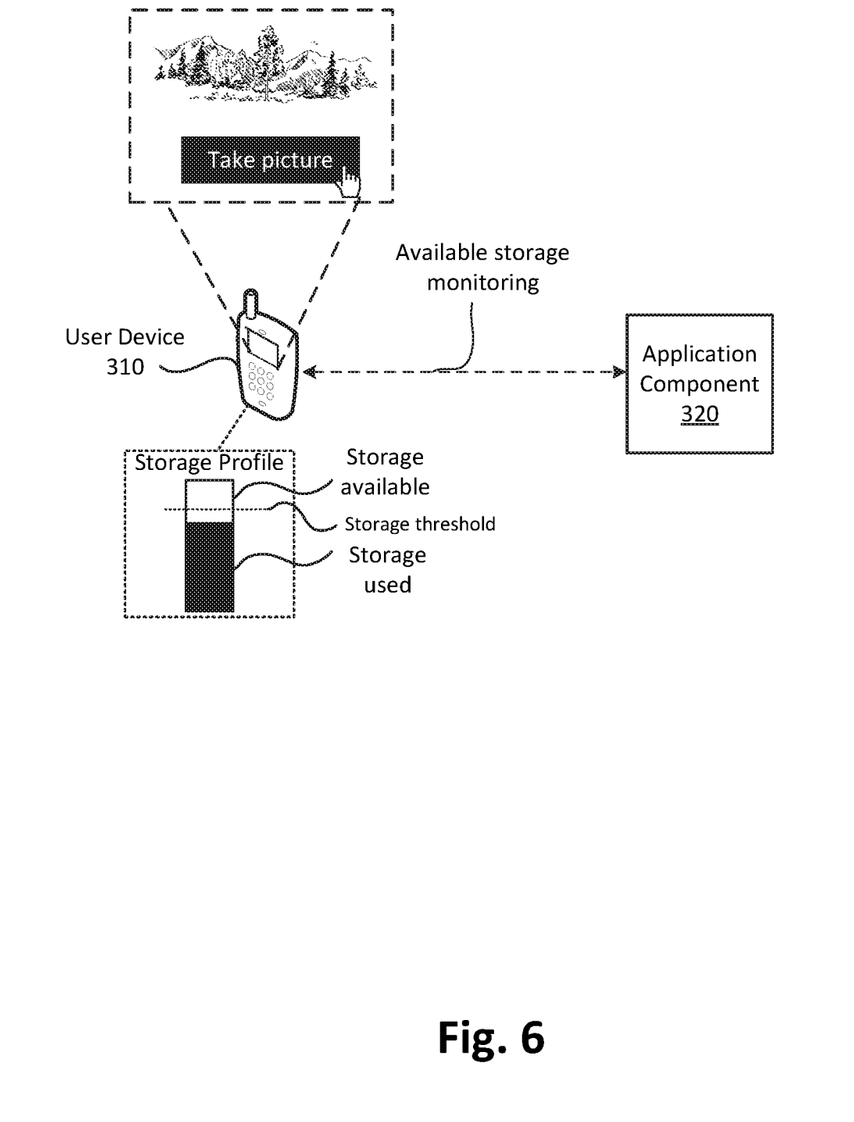
FIGS. 6-8 illustrate an example implementation for proactively clearing storage space on a user device.
Figure 7:
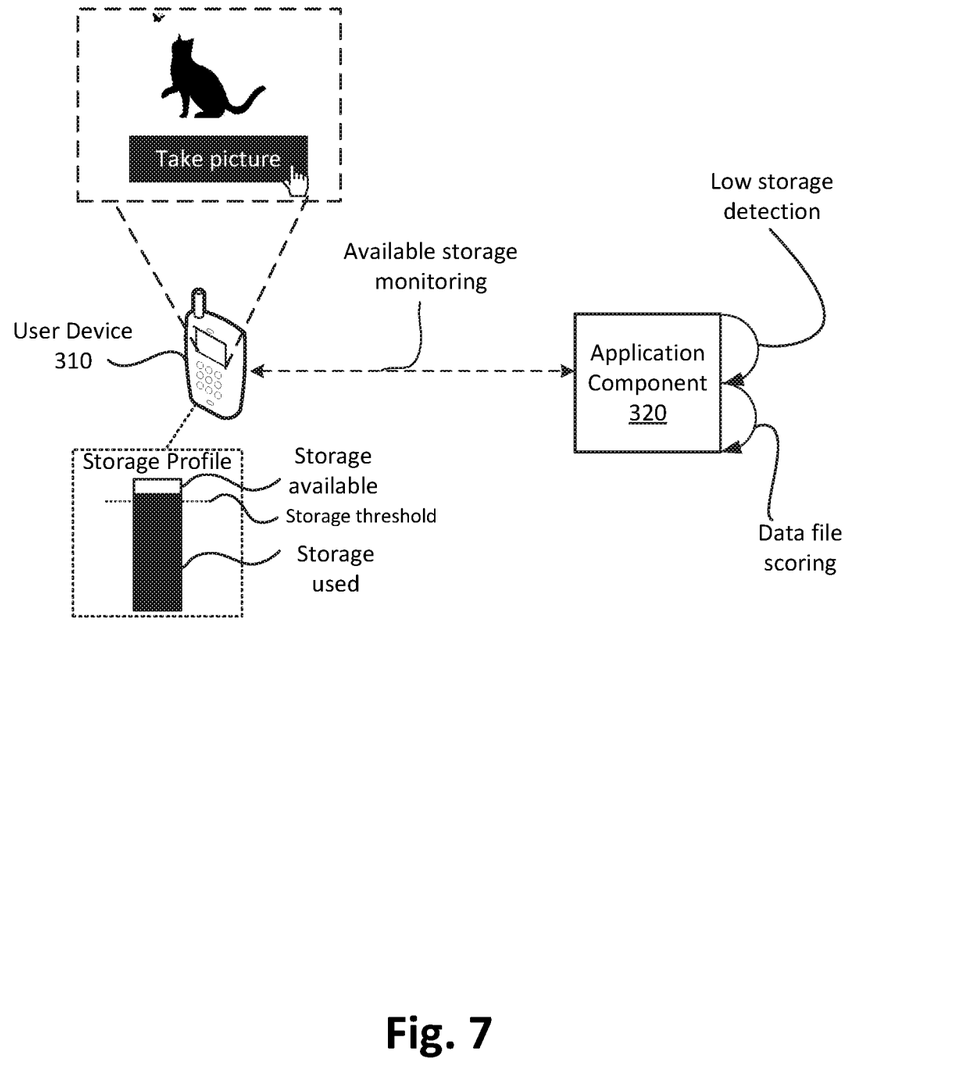

FIGS. 6-8 illustrate an example implementation for proactively clearing storage space on a user device. As shown in FIG. 6, user device 310 may be used to capture images when storage space is available on user device 310. Referring to FIG. 7, the amount of available storage space on user device 310 may drop below a particular threshold as user device 310 is used to capture images, videos, audio, and/or download other types of data files. As further shown in FIG. 7, application component 320 may determine that the amount of available storage has dropped below the particular threshold, and may score the data files currently being stored by user device 310. Additionally, or alternatively, the files may have previously been scored.

Figure 8:
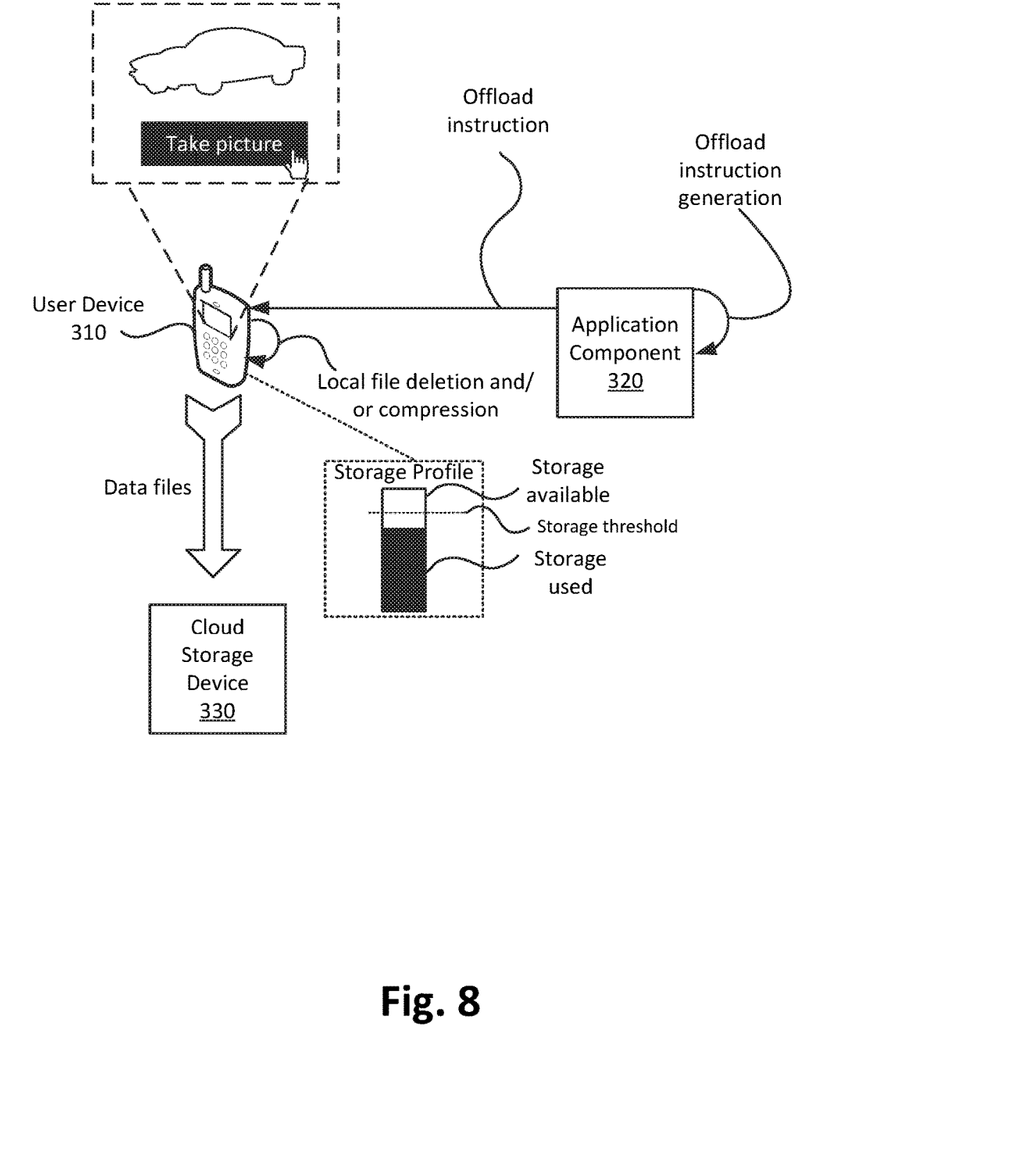

Referring to FIG. 8, application component 320 may generate an offload instruction based on the score of the data files, an amount of storage space remaining on user device 310, and/or an amount of storage space remaining on cloud storage device 330. Application component 320 may output the offload instruction to user device 310, and user device 310 may execute the offload instruction to delete particular data files from a local storage of user device 310, compress particular data files, and/or output particular data files to cloud storage device 330 in accordance with the offload instruction. As a result, storage space on user device 310 may be proactively cleared so that a user of user device 310 may continue to capture images using user device 310 without the need to reactively clear storage space on user device 310.

While a particular example is shown in FIGS. 6-8, the above description is merely an example implementation. In practice, other examples are possible from what is described above in FIGS. 6-8.

Figure 9:
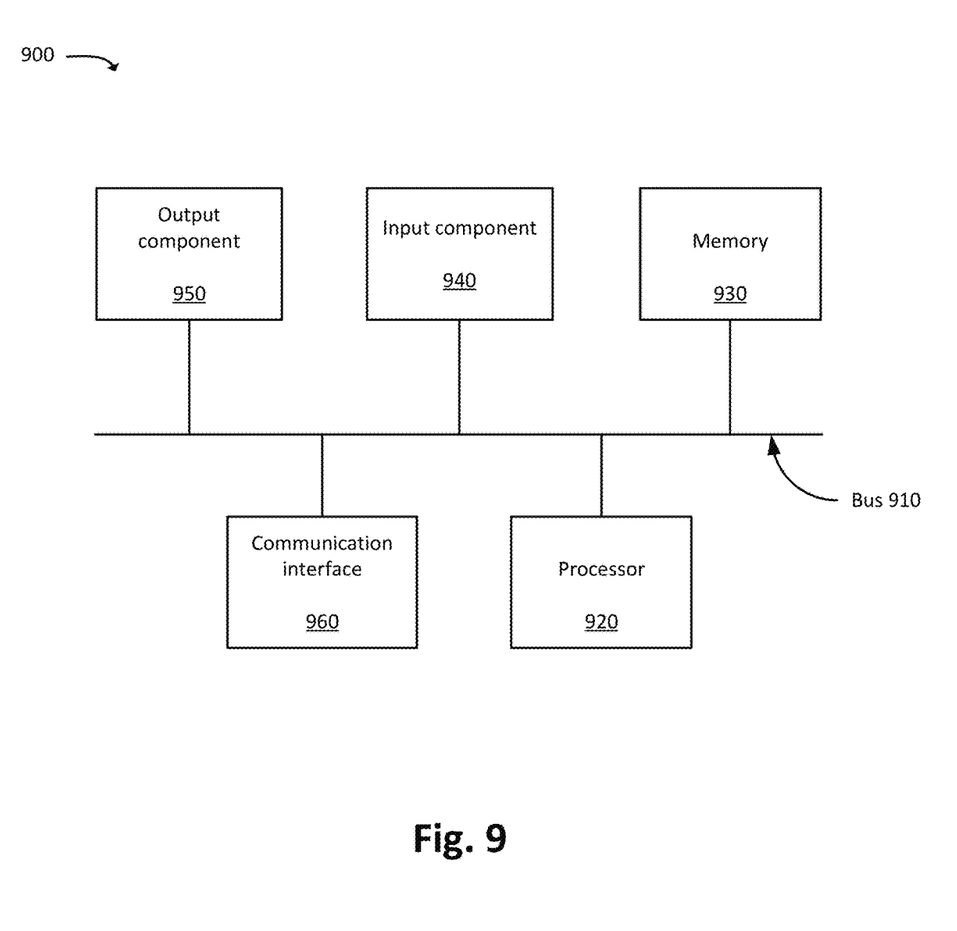
FIG. 9 illustrates example components of one or more devices, according to one or more implementations described herein.

FIG. 9 is a diagram of example components of device 900. One or more of the devices described above (e.g., with respect to FIGS. 1-3 and 6-8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3 and 6-8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    scoring, by a device, a plurality of data files stored by a user device;
    monitoring, by the device, an amount of storage available on the user device;
    determining, by the device and based on the monitoring, that the amount of storage is below a first threshold;
    selecting, by the device, particular data files, of the plurality of data files, based on the scoring and based on the amount of storage available on the user device;
    determining, by the device, an amount of storage available on a cloud storage server, the cloud storage server including a remote device that is different from the user device;

selecting, by the device and without user input to select a storage clearing operation, between a first storage clearing operation, a second storage clearing operation, and a third storage clearing operation in response to the amount of storage available on the user device being below the first threshold, the scoring, and the amount of storage available on the cloud storage server, wherein each of the first, second, and third storage clearing operations are different;

performing, by the device, the first storage clearing operation in response to (i) the cloud storage server having a sufficient amount of storage to store the selected particular data files and (ii) the amount of storage available on the user device being below the first threshold, wherein performing the first storage clearing operation comprises:
 providing the selected particular data files to the cloud storage server for storage on the cloud storage server, and
 deleting the selected particular data files from the user device;

performing, by the device, the second storage clearing operation in response to (i) the cloud storage server having an insufficient amount of storage to store the selected particular data files, (ii) the amount of storage available on the user device being below the first threshold, and (iii) the scores for the plurality of data files exceeding a second threshold, wherein performing the second storage clearing operation comprises:
 compressing the selected particular files, and
 retaining the compressed selected particular files on the user device; and performing, by the device, the third storage clearing operation in response to (i) the cloud storage server having an insufficient amount of storage to store the selected particular data files, (ii) the amount of storage available on the user device being below the first threshold, and (iii) the scores for the selected particular data files not exceeding the second threshold, wherein performing the third storage clearing operation comprises:
 deleting the selected particular data files from the user device, and
 forgoing outputting the selected particular data files to the cloud storage server, wherein deletion of the selected particular data files occurs without receiving a user interaction to instruct the device to delete the selected particular data files from the user device,
wherein the user device has an amount of available storage space exceeding the first threshold after deleting or compressing the selected particular data files.

2. The method of claim 1, wherein scoring the data files is based on values associated with a plurality of attributes of the data files.

3. The method of claim 2, wherein the attributes of one of the data files include at least one of:
 contents of the data file,
 metadata associated with the data file,
 a measure of quality of the data file, or
 a rating associated with the data file.

4. The method of claim 2, wherein each attribute, of the plurality of attributes, is associated with a different weight, wherein scoring the data files includes, for each data file:
 includes generating a value for each attribute, of the plurality of attributes, associated with the each data file,
 weighting each generated value for each attribute based on the weight associated with the attribute, and
 generating a score for the each data file based on the weighted values.

5. The method of claim 1, wherein the device is the user device.

6. The method of claim 1, further comprising:
 identifying a first measure of blurriness associated with a first data file, of the plurality of data files;
 identifying that a blur effect was added to the first data file; and
 identifying a second measure of blurriness associated with a second data file, of the plurality of data files,
 wherein scoring the first data file includes forgoing using the first measure of blurriness in generating a score for the first data file, based on identifying that the blur effect was added to the first data file, and
 wherein scoring the second data file includes using the second measure of blurriness in generating a score for the second data file.

7. The method of claim 1, wherein the scoring of a particular data file, of the plurality of data files, is based on whether the particular data file includes an image or a video of a family member of a user of the user device.

8. The method of claim 1, wherein the scoring of a particular data file, of the plurality of data files, is based on whether the particular data file has been edited by a user of the user device.

9. A system comprising:
 a non-transitory memory device storing a plurality of processor-executable instructions; and
 a processor configured to execute the processor-executable instructions, wherein executing the processor-executable instructions causes the processor to:
  monitor an amount of storage available on a user device;
  determine, based on the monitoring, that the amount of storage is below a first threshold;
  score a plurality of data files stored by the user device;
  select particular data files, of the plurality of data files, based on the scoring and based on the amount of storage available on the user device;
  determine an amount of storage available on a cloud storage server, the cloud storage server including a remote device that is different from the user device;
  select, without user input to select a storage clearing operation, between a first storage clearing operation, a second storage clearing operation, and a third storage clearing operation in response to the amount of storage on the user device is below the first threshold, the scoring, and the amount of storage available on the cloud storage server;
  perform the first storage clearing operation in response to (i) the cloud storage server having a sufficient amount of storage to store the selected particular data files and (ii) the amount of storage available on the user device being below the first threshold, wherein performing the first storage clearing operation causes the user device to:
   provide the selected particular data files to the cloud storage server for storage on the cloud storage server, and
   delete the selected particular data files from the user device,
  perform the second storage clearing operation in response to (i) the cloud storage server having an insufficient amount of storage to store the selected particular data files, (ii) the amount of storage available on the user device being below the first threshold, and (iii) the scores for the plurality of data files exceeding a second threshold, wherein performing the second storage clearing operation causes the user device to:
compress the selected particular files, and
retain the compressed selected particular files on the user device; and
perform the third storage clearing operation in response to (i) the cloud storage server having an insufficient amount of storage to store the selected particular data files, (ii) the amount of storage available on the user device being below the first threshold, and (iii) the scores for the selected particular data files not exceeding the second threshold, wherein performing the third storage clearing operation causes the user device to:
delete the selected particular data files from the user device, and
forgo outputting the selected particular data files to the cloud storage server,
wherein deletion of the selected particular data files occurs without receiving a user interaction to instruct the device to delete the selected particular data files from the user device,
wherein the user device has an amount of available storage space exceeding the first threshold after deleting or compressing the selected particular data files.

10. The system of claim 9, wherein executing the processor-executable instructions, to score the data files, causes the processor to score the data files based on weighted values associated with each attribute, of a plurality of attributes of the data files.

11. The system of claim 10, wherein the attributes of one of the data files include at least one of:
contents of the data file,
metadata associated with the data file,
a measure of quality of the data file, or
a rating associated with the data file.

12. The system of claim 11, wherein the measure of quality is based on at least one of:
a measure of blurriness, or
whether the data file includes duplicate content of another data file.

13. The system of claim 9, wherein executing the processor-executable instructions to monitor the amount of storage available on a user device, causes the processor to monitor an amount of storage available on a removable storage device connected to the user device.

14. The system of claim 9, wherein executing the processor-executable instructions further causes the processor to:
identify a first measure of blurriness associated with a first data file, of the plurality of data files;
identify that a blur effect was added to the first data file; and
identify a second measure of blurriness associated with a second data file, of the plurality of data files,
wherein scoring the first data file includes forgoing using the first measure of blurriness in generating a score for the first data file, based on identifying that the blur effect was added to the first data file, and
wherein scoring the second data file includes using the second measure of blurriness in generating a score for the second data file.

15. The system of claim 9, wherein the scoring of a particular data file, of the plurality of data files, is based on whether the particular data file includes an image or a video of a family member of a user of the user device.

16. The system of claim 9, wherein the scoring of a particular data file, of the plurality of data files, is based on whether the particular data file has been edited by a user of the user device.

17. A non-transitory computer-readable medium storing a plurality of instructions which, when executed by one or more processors associated with a device, cause the one or more processors to:
monitor an amount of storage consumed on a user device;
determine, based on the monitoring, that the amount of storage consumed is above a first threshold;
score a plurality of data files stored by the user device, wherein the instructions, to score a particular data file, of the plurality of data files, includes instructions to:
identify a plurality of attributes associated with the particular data file,
generate a value for each attribute, of the identified plurality of attributes,
identify a weight associated with each attribute, of the identified plurality of attributes, wherein different attributes are associated with different weights,
apply the weight, for each attribute, to the generated value for each attribute, and
generate a score for the particular data file based on the weighted values for each attribute;
determine an amount of storage available on a cloud storage server, the cloud storage server including a remote device that is different from the user device;
select one or more data files, of the plurality of data files, that should be compressed or deleted, based on the scoring and based on an amount of storage available on the user device;
perform a first storage clearing operation in response to (i) the cloud storage server having an insufficient amount of storage to store the one or more data files, (ii) the amount of storage consumed on the user device being above the first threshold, and (iii) the scores for the one or more data files exceeding a second threshold, wherein performing the first storage clearing operation causes the user device to:
compress the one or more files, and
retain the compressed one or more files on the user device; and
perform a second storage clearing operation in response to (i) the cloud storage server having an insufficient amount of storage to store the one or more data files, (ii) the amount of storage consumed on the user device being above the first threshold, and (iii) the scores for the one or more data files not exceeding the second threshold, wherein performing the second storage clearing operation causes the user device to:
delete the selected particular data files from the user device, and
forgo outputting the selected particular data files to the cloud storage server,
wherein the user device has an amount of available storage space above the first threshold after compressing or deleting the one or more data files.

18. The non-transitory computer-readable medium of claim 17, wherein the attributes of one of the particular data file include at least one of:
contents of the particular data file,
metadata associated with the particular data file, a measure of quality of the particular data file, or a rating associated with the particular data file.

19. The non-transitory computer-readable medium of claim 17, wherein executing the plurality of instructions further causes the one or more processors to:

cause the user device to delete one or more other data files, of the plurality of data files, based on the scoring.

20. The non-transitory computer-readable medium of claim 17, wherein the scoring of a particular data file, of the plurality of data files, is based on at least one of:

whether the particular data file includes an image or a video of a family member of a user of the user device, or whether the particular data file has been edited by a user of the user device.

\* \* \* \* \*